United States Patent
Hayase et al.

(10) Patent No.: US 7,520,064 B2
(45) Date of Patent: Apr. 21, 2009

(54) LASER SURVEYING INSTRUMENT

(75) Inventors: Shin-ichi Hayase, Itabashi-ku (JP);
Yasuhito Haijima, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 11/975,775

(22) Filed: Oct. 22, 2007

(65) Prior Publication Data
US 2008/0110037 A1  May 15, 2008

(30) Foreign Application Priority Data
Nov. 15, 2006  (JP) .............................. 2006-309349

(51) Int. Cl.
*G01C 15/02*  (2006.01)
(52) U.S. Cl. .......................................... 33/290; 33/227
(58) Field of Classification Search .................. 33/227, 33/290, 291, DIG. 21; 356/141.4
See application file for complete search history.

(56) References Cited

U.S. PATENT DOCUMENTS

| 5,552,886 A * | 9/1996 | Kitajima et al. ................ 33/291 |
| 5,784,155 A * | 7/1998 | Ohtomo et al. ............ 356/141.1 |
| 6,044,567 A * | 4/2000 | Feist .............................. 33/290 |
| 6,643,004 B2 | 11/2003 | Detweiler et al. ......... 356/141.4 |
| 7,059,058 B2 * | 6/2006 | Kousek et al. ................. 33/290 |
| 2004/0107589 A1 * | 6/2004 | Ohtomo et al. ............... 33/290 |
| 2005/0172503 A1 * | 8/2005 | Kumagai et al. .............. 33/290 |

FOREIGN PATENT DOCUMENTS

JP  7-25619  6/1995

* cited by examiner

*Primary Examiner*—G. Bradley Bennett
(74) *Attorney, Agent, or Firm*—Nields, Lemack & Frame, LLC

(57) ABSTRACT

A laser surveying instrument, comprising a rotating unit for projecting a laser beam by rotary irradiation, a main unit for rotatably supporting the rotating unit, and a sealing means for sealing between the rotating unit and the main unit, wherein the sealing means comprises annular ridges formed on the main unit concentrically to the rotation center of the rotating unit, and annular grooves formed on the rotating unit so that the annular ridges are engaged in the annular grooves and gaps are formed between the annular ridges and the annular grooves, the annular ridges and the annular grooves being arranged concentrically to each other and disposed in double arrangement, and wherein the sealing means further comprises a route bent and crooked in a radial direction by the gaps, and a cavity disposed at least at one point along the route and having larger volume than the volume of the gap.

7 Claims, 5 Drawing Sheets

LASER SURVEYING INSTRUMENT

BACKGROUND OF THE INVENTION

The present invention relates to a laser surveying instrument for projecting a laser beam in rotary irradiation and for forming a reference plane and a reference line. In particular, the present invention relates to a laser surveying instrument with waterproof function.

As a type of laser surveying instrument used for forming a reference plane and a reference line, which are required for operations of civil engineering work, building and construction project, etc. a laser surveying instrument for projecting a laser beam in rotary irradiation is known.

A laser surveying instrument has a rotating unit for deflecting and projecting a laser beam. By rotating the rotating unit, a reference plane or a reference line is formed by the laser beam.

The laser surveying instrument may be used under outdoor conditions, and the laser surveying instrument must have waterproof function so that the laser surveying instrument can also be used under rainy weather.

A laser surveying instrument with waterproof function has been known in the past, which has waterproof structure to enclose the rotating part by a cover with transparency. A type of laser surveying instrument having simple and inexpensive waterproof structure is disclosed in U.S. Pat. No. 6,643,004.

Referring to FIG. 6, description will be given below on a conventional type laser surveying instrument.

Inside a housing 1, a rotation mechanism accommodating unit 3 is movably supported in two directions perpendicularly crossing each other via a gimbal supporting unit 2. A rotation shaft 4 extending in a vertical direction is rotatably supported on the rotation mechanism accommodating unit 3. The rotation shaft 4 is connected with a motor 5, and an encoder 6 is mounted on the rotation shaft 4.

On the upper end of the rotation shaft 4, a rotary head 7 is mounted, and a light emitter 8 is accommodated in the rotary head 7. The light emitter 8 comprises a laser diode 9, a collimating lens 10, a rod lens 11, etc. A laser beam 13 emitted from the laser diode 9 is projected as linear luminous fluxes extending in a vertical direction.

The upper portion of the rotation mechanism accommodating unit 3 is protruding upward from the housing 1. A gap between the housing 1 and the rotation mechanism accommodating unit 3 is sealed by a bellows 14, and the protruding portion of the rotation mechanism accommodating unit 3 and the rotary head 7 are enclosed by a cover 15. The cover 15 has a light projection window 16, and the laser beam 13 is projected through the light projection window 16.

When the laser diode 9 is turned on and the motor 5 is rotated, the rotary head 7 is rotated via the rotation shaft 4 so that the laser beam 13 is rotated in a horizontal direction.

A labyrinthine seal 17 serving as a waterproof means is provided between the rotary head 7 and the rotation mechanism accommodating unit 3, and a gap between the rotary head 7 and the rotation mechanism accommodating unit 3 is sealed by the labyrinthine seal 17.

Now, referring to FIG. 7, description will be given on the labyrinthine seal 17.

On the upper surface of the rotation mechanism accommodating unit 3, annular projected rims (ridges) 18 and annular grooves 19, each having cross-sectional profile in rectangular shape, are disposed concentrically and in double arrangement respectively. On the lower surface of the rotary head 7, annular grooves 21 and annular ridges 22 are arranged concentrically. The annular ridge 18 is movably engaged in the annular groove 21, and the annular groove 19 is movably engaged with the annular ridge 22. The annular ridge 18 and the annular groove 21 as well as the annular groove 19 and the annular ridge 22 are not in contact with each other. A narrow space 23 with cross-sectional profile in crank-like shape is formed in the radial direction.

Because the bending space 23 with crank-like shape is formed between the rotation mechanism accommodating unit 3 and the rotary head 7, the intrusion of water, dust, etc. from outside to the inner space of the rotation mechanism accommodating unit 3 can be prevented. The rotary head 7 can be rotated without any resistance because the rotating portion is not contact with the fixed portion in the labyrinthine seal 17.

It is preferable that the space 23 is small for the purpose of preventing direct intrusion of rainwater on rainy day or under windy and rainy weather or the like. If the space 23 is small, capillary phenomenon occurs. In such case, gradual intrusion of water from outside cannot be prevented.

Therefore, by the conventional type water preventive means, perfect waterproof effect cannot be necessarily obtained when the surveying instrument is used under severe rainy condition or under rainy weather for long time.

SUMMARY OF THE INVENTION

It is an object of the present invention to provide a laser surveying instrument, by which it is possible to improve the waterproof function of the water preventing means disposed between the rotating portion and the fixed portion, and to have better water preventing function.

To attain the above object, the present invention provides a laser surveying instrument, which comprises a rotating unit for projecting a laser beam by rotary irradiation, a main unit for rotatably supporting the rotating unit, and a sealing means for sealing between the rotating unit and the main unit, wherein the sealing means comprises annular ridges formed on the main unit concentrically to the rotation center of the rotating unit, and annular grooves formed on the rotating unit so that the annular ridges are engaged in the annular grooves and gaps are formed between the annular ridges and the annular grooves, the annular ridges and the annular grooves being arranged concentrically to each other and disposed at least in double arrangement, and wherein the sealing means further comprises a route bent and crooked in a radial direction by the gaps, and a cavity disposed at least at one point along the route and having larger volume than the volume of the gap. Also, the present invention provides the laser surveying instrument as described above, wherein the annular ridges at least include a first annular ridge formed at an outer position and a second annular ridge formed at an inner position, wherein the second annular ridge is higher than the first annular ridge, and the cavity is formed at a point closer to the first annular ridge between the second annular ridge and the annular groove where the second annular ridge is engaged. Further, the present invention provides the laser surveying instrument as described above, wherein an eave protruding in an outward direction is provided on an upper end of the second annular ridge, the cavity is disposed under the eave, and a lower surface of the eave is at a position higher than the first annular ridge. Also, the present invention provides the laser surveying instrument as described above, wherein at least inner peripheral surface of at least one of the annular ridges is tilted in an outward direction toward the upper end. Further, the present invention provides the laser surveying instrument as described above, wherein the rotating unit is mounted so as to sandwich a flat plate which is a part of the main unit, the first annular ridge and the second annular ridge are disposed on an upper surface of the flat plate, a third annular ridge is formed on a lower surface of the flat plate, and an annular groove where the third annular ridge is inserted on non-contact basis is formed on a portion of the rotating unit to face toward the lower surface. Also, the present invention provides the laser surveying instrument as described above, wherein a fourth annular ridge is further formed on the portion of the rotating unit to face toward the lower surface, wherein an eave protruding toward the center is provided on an upper end of the fourth annular ridge, and a cavity is formed under the eave. Further, the present invention provides the laser surveying instrument as described above, wherein the cavity has gap and volume sufficient to avoid capillary phenomenon.

According to the present invention, there are provided a rotating unit for projecting a laser beam by rotary irradiation, a main unit for rotatably supporting the rotating unit, and a sealing means for sealing between the rotating unit and the main unit, and the sealing means comprises annular ridges formed on the main unit concentrically to the rotation center of the rotating unit, and annular grooves formed on the rotating unit so that the annular ridges are engaged in the annular grooves and gaps are formed between the annular ridges and the annular grooves, the annular ridges and the annular grooves being arranged concentrically to each other and disposed at least in double arrangement, and the sealing means further comprises a route bent and crooked in a radial direction by the gaps, and a cavity disposed at least at one point along the route and having larger volume than the volume of the gap. As a result, the intrusion of water and dust can be prevented by using a route with windings and bendings. Also, capillary phenomenon can be excluded by the cavity, and the intrusion of water can be prevented.

Also, according to the present invention, the annular ridges at least include a first annular ridge formed at an outer position and a second annular ridge formed at an inner position, and the second annular ridge is higher than the first annular ridge, and the cavity is formed at a point closer to the first annular ridge between the second annular ridge and the annular groove where the second annular ridge is engaged. The water intruding by running over the first annular ridge is trapped and stays in the cavity, and the intrusion of water to the inner space is suppressed. When the surface level of the water staying in the cavity is higher than the first annular ridge, the intrusion of the water into the inner space can be prevented by the pressure of the water trapped and staying in the cavity.

Further, according to the present invention, an eave protruding in an outward direction is provided on an upper end of the second annular ridge, the cavity is disposed under the eave, and a lower surface of the eave is at a position higher than the first annular ridge. When the surface level of the water staying in the cavity is higher than the first annular ridge, the intrusion of the water into the inner space can be prevented by a pressure of the staying water. Also, the intrusion of the water staying in the cavity into the inner space can be prevented when the main unit is tilted or placed at lateral position.

Also, according to the present invention, at least inner peripheral surface of at least one of the annular ridges is tilted in an outward direction toward the upper end. When the main unit is tilted or the main unit is pulled down, the intruding water in the route can be effectively discharged to outside by gravitational force.

Further, according to the present invention, the rotating unit is mounted so as to sandwich a flat plate which is a part of the main unit, the first annular ridge and the second annular ridge are disposed on an upper surface of the flat plate, a third annular ridge is formed on a lower surface of the flat plate, and an annular groove where the third annular ridge is inserted on non-contact basis is formed on a portion of the rotating unit to face toward the lower surface. Water and dust intruding to the central portion are further sealed by the third annular ridge and the annular groove on the rear side, and effective water-preventive and dust preventive effects can be attained.

DETAILED DESCRIPTION OF THE PREFERRED EMBODIMENTS

Description will be given below on the best mode for carrying out the present invention referring to the attached drawings.

Figure 1:
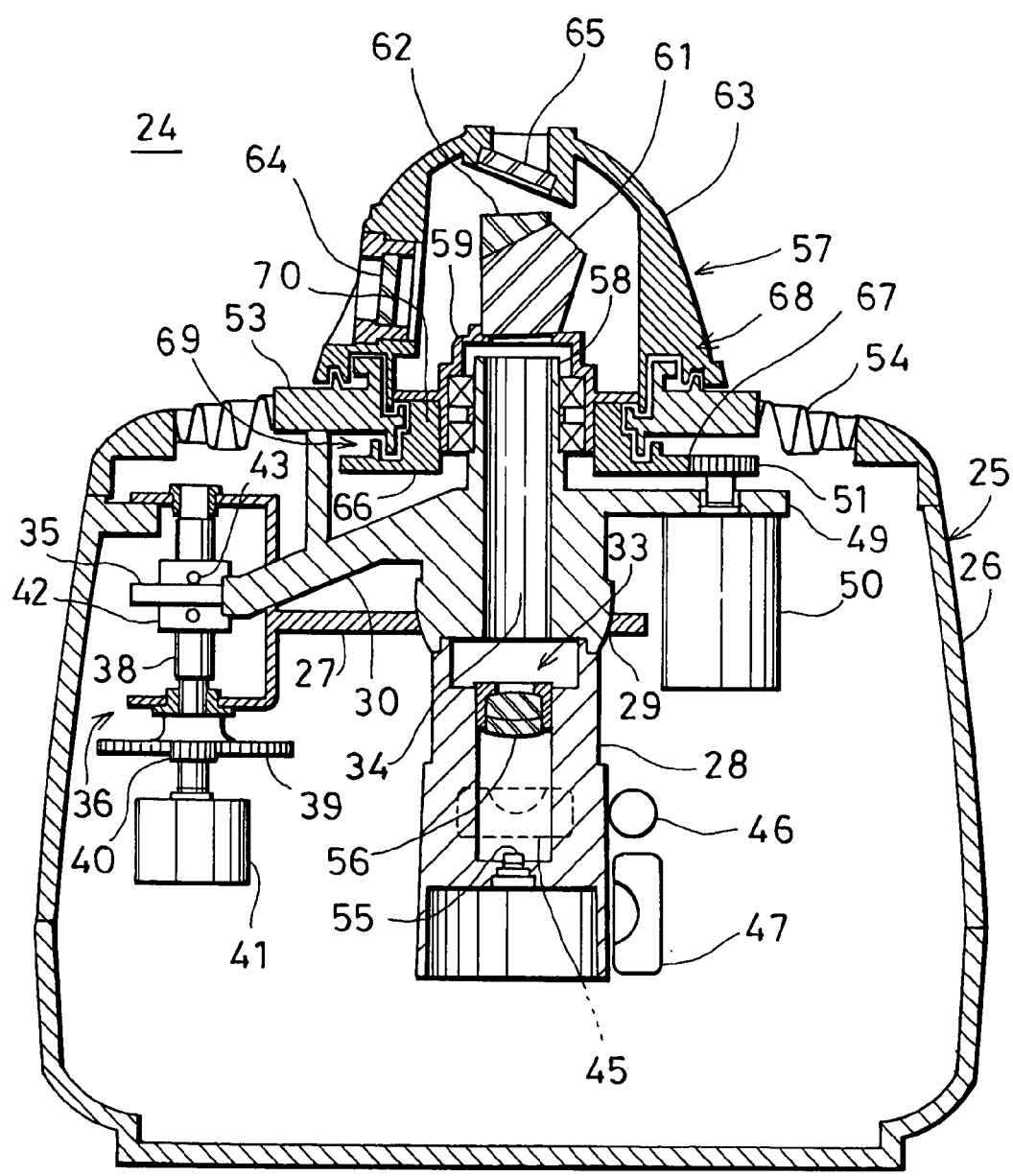
FIG. 1 is a cross-sectional view of a laser surveying instrument according to an embodiment of the present invention.

FIG. 1 shows a laser surveying instrument 24 according to the present invention. FIG. 1 shows a condition where the laser surveying instrument 24 is installed at longitudinal position.

The laser surveying instrument 24 comprises a rotating unit 57 (to be described later) for projecting a laser beam by rotary irradiation and a main unit 25 for rotatably supporting the rotating unit 57.

First, description will be given on the main unit 25.

A supporting shelf 27 is installed inside a housing 26. A light emitter accommodating tube 28 is mounted so as to penetrate the supporting shelf 27 in a vertical direction. A connecting portion to connect the light emitter accommodating tube 28 with the supporting shelf 27 is designed in form of a spherical seat (bearing seat) 29 so that the light emitter accommodating tube 28 can be tilted in any direction as desired.

The light emitter accommodating tube 28 has two tilting arms extending in two directions, which perpendicularly cross each other. One of the tilting arms is an X-axis tilting arm 30 extending in an X-axis direction (left-to-right direction with respect to the paper surface in FIG. 1), and the other is a Y-axis tilting arm (not shown) extending in a Y-axis direction (vertical direction with respect to the paper surface in FIG. 1). The light emitter accommodating tube 28 is designed in cylindrical shape with a hollow portion inside. The central axis of the light emitter accommodating tube 28 is aligned with a Z-axis direction (up-to-bottom direction with respect to the paper surface), and the central axis is aligned with an optical axis 34 of a light emitter 33 accommodated inside the light emitter accommodating tube 28.

At a tip of each of the X-axis tilting arm 30 and the Y-axis tilting arm, an engaging pin 35 (only one of them is shown) is mounted, and the engaging pin 35 is connected to one of tilting mechanisms 36 (only one of them is shown). Because the tilting mechanisms 36 (only one of them is shown) have the same mechanism, description will be given below only on one of the tilting mechanisms 36.

The tilting mechanism 36 has a screw shaft 38 installed in an up-to-bottom direction. The screw shaft 38 is rotatably supported, and a tilting gear 39 is attached on a lower end of the screw shaft 38. A tilt driving gear 40 is engaged with the tilting gear 39, and the tilt driving gear 40 is rotated by a leveling motor 41.

A nut block 42 is engaged on the screw shaft 38 by threading. Connecting pins 43 are projecting in horizontal direction on the nut block 42, and the connecting pins 43 and the engaging pin 35 are slidably engaged with each other.

On the light emitter accommodating tube 28, there are provided an X-axis tilt sensor 45 for detecting the tilting in an X-axis direction, a Y-axis tilt sensor 46 for detecting the tilting in a Y-axis direction, and a Z-axis tilt sensor 47 for detecting the tilting in a Z-axis direction under the condition that the laser surveying instrument 24 is installed in a lateral direction.

On a certain portion of the light emitter accommodating tube 28, i.e. a portion, which does not interfere with the X-axis tilting arm 30 and the Y-axis tilting arm, a motor supporting seat 49 is disposed. A scanning motor 50 is mounted on the motor supporting seat 49, and a scan driving gear 51 is mounted on an output shaft of the scanning motor 50.

A ceiling plate 53 is mounted on an upper end of the light emitter accommodating tube 28. A bellows 54 made of rubber are disposed between the ceiling plate 53 and the upper end of the housing 26 so that the ceiling plate 53 is liquid-tightly sealed with the housing 26 and the ceiling plate 53 can be tilted in any direction as desired with respect to the housing 26.

The light emitter 33 comprises a laser diode 55 as a light source, an objective lens 56, etc. The laser diode 55 and the objective lens 56 are arranged on the optical axis 34 in this order from the bottom to the top.

The rotating unit 57 is rotatably mounted so as to be stretched over the ceiling plate 53 and the light emitter accommodating tube 28. Description will be given below on the rotating unit 57.

The upper end of the light emitter accommodating tube 28 is to serve as a rotation shaft 58 of the rotating unit 57. A prism holder 59 is rotatably mounted on the rotation shaft 58 via a bearing, and a pentagonal prism 61 is mounted on the prism holder 59. On the upper surface of the pentagonal prism 61, a wedge prism 62 is disposed, and the boundary surface between the wedge prism 62 and the pentagonal prism 61 is designed as a half-mirror. The pentagonal prism 61 deflects the optical axis 34 in a horizontal direction so that the laser beam emitted from the laser diode 55 is projected in a horizontal direction, while a part of the laser beam is allowed to pass through the pentagonal prism 61 and is projected in a vertical direction.

On the prism holder 59, a rotating unit cover 63 to cover the pentagonal prism 61 is provided, and the rotating unit cover 63 is rotated integrally with the pentagonal prism 61. On the rotating unit cover 63, there are arranged a light projection window 64 for projecting the laser beam in a horizontal direction and a light projection window 65 for projecting the laser beam in a vertical direction.

At the outside of a lower portion of the prism holder 59, a rotating plate 66 is fitted. The rotating plate 66 is positioned on the lower side of the ceiling plate 53 so that the ceiling plate 53 is sandwiched between the rotating plate 66 and the rotating unit 57. On outer periphery of the rotating plate 66, a gear is provided. The gear is engaged with the scan driving gear 51, and the outer periphery of the rotating plate 66 serves as a scanning gear 67.

On a portion between the rotating portion (including the rotating unit cover 63, the rotating plate 66, etc.) and the fixed portion such as the ceiling plate 53, etc., a sealing means is disposed to prevent the intrusion of rainwater and dust so that the laser surveying instrument 24 can be used in outdoor condition on rainy day or under dusty environment. The sealing means include a first sealing means 68 installed between the ceiling plate 53 and the rotating unit cover 63 and a second sealing means 69 installed between the ceiling plate 53 and the rotating plate 66.

Now, referring to FIG. 2, description will be given on the sealing means.

A central portion 70 of the rotating plate 66 is protruded in an upward direction. The protruded central portion 70 movably passes through the central region of the ceiling plate 53. On the upper surface of the ceiling plate 53, a first annular ridge 71 with its center on the optical axis 34 is formed to be protruded. At an inner position than the first annular ridge 71, a second annular ridge 72 is formed to be protruded. Further, a third annular ridge 73 is formed to be protruded at an inner position than the second annular ridge 72. The third annular ridge 73 is at a position to face to the central portion 70 with a certain gap between them.

The cross-sectional profile of the first annular ridge 71 has a height h1. Its outer peripheral surface runs perpendicularly to the upper surface of the ceiling plate 53. Its inner peripheral surface is tilted in the outward direction. The cross-sectional profile of the second annular ridge 72 has a height h2. The second annular ridge 72 is designed in hook-shaped form and has an eave 72a protruding in the outward direction at its upper end. The lower surface of the eave 72a has a height h3. The cross-sectional profile of the third annular ridge 73 is designed in rectangular shape, and the upper surface of the third annular ridge 73 is lower than the upper surface of the ceiling plate 53.

Between the first annular ridge 71 and the second annular ridge 72, there is provided a first annular groove 74. Between the second annular ridge 72 and the third annular ridge 73, there is provided a second annular groove 75.

On the lower surface of the rotating unit cover 63, a third annular groove 76 concentric with the first annular ridge 71 is formed. A fourth annular groove 77 concentric with the third annular groove 76 is formed at a position inside the third annular groove 76. On the boundary between the third annular groove 76 and the fourth annular groove 77, there is formed a fourth annular ridge 78, and a fifth annular ridge 79 is formed along the inner peripheral surface of the rotating unit cover 63.

The cross-sectional profile of the third annular groove 76 is approximately similar to the shape of the first annular ridge 71. The first annular ridge 71 is engaged into the third annular groove 76, and a gap with the same width is formed between the first annular ridge 71 and the third annular groove 76.

The cross-sectional profile of the second annular ridge 72 is approximately in rectangular shape. The second annular ridge 72 is movably engaged in the fourth annular groove 77. A gap is formed between the fourth annular groove 77 and the second annular ridge 72, and a first water trap 81 is disposed under the eave 72a. The first water trap 81 is a cavity with sufficient volume to trap and reserve the intruding water. The first water trap 81 is so designed that sufficient gap and volume can be kept to at least avoid capillary phenomenon.

When the fifth annular ridge 79 is engaged into the second annular groove 75, a gap is formed between the second annular groove 75 and the fifth annular ridge 79, and the second annular groove 75 fulfills the function as a second water trap. The second water trap is so designed that sufficient gap and volume can be kept to at least avoid capillary phenomenon.

The first annular ridge 71, the second annular ridge 72, the third annular groove 76, the fourth annular groove 77, etc. make up together the first sealing means 68.

On the lower surface of the ceiling plate 53, a sixth annular ridge 82 is formed near the central portion 70. On the upper surface of the rotating plate 66, a seventh annular ridge 84 is formed so that a fifth annular groove 83 is formed in ring-like shape. The sixth annular ridge 82 is placed into the fifth annular groove 83. A gap is formed between the fifth annular groove 83 and the sixth annular ridge 82, and the fifth annular groove 83 fulfills the function as a third water trap. The third water trap is so designed that sufficient gap and volume can be kept to at least avoid capillary phenomenon.

The third annular ridge 73, the sixth annular ridge 82, the fifth annular groove 83, etc. make up together the second sealing means 69.

The intrusion of rainwater and dust is prevented by the first sealing means 68. When rainwater and dust pass through the first sealing means 68, rainwater and dust are further prevented by the second sealing means 69 from entering the inner space of the housing 26. Depending on the environmental conditions where the laser surveying instrument is used, either one of the first sealing means 68 or the second sealing means 69 may not be used.

Next, description will be given on operation of the laser surveying instrument.

First, description will be given on a case where the laser surveying instrument 24 is installed at longitudinal position.

When the laser surveying instrument 24 is installed, leveling of the laser surveying instrument 24 is performed.

Tilting in the X-axis direction and tilting in the Y-axis direction are detected by the X-axis tilt sensor 45 and the Y-axis tilt sensor 46 respectively. Based on the results of detection by the X-axis tilt sensor 45 and the Y-axis tilt sensor 46, the leveling motors 41 (only one of them is shown) are driven. The nut blocks 42 are moved up and down. The X-axis tilting arm 30 and the Y-axis tilting arm (not shown) are tilted, and adjustment is made so that the X-axis tilt sensor 45 and the Y-axis tilt sensor 46 detect horizontal position. When the X-axis tilt sensor 45 and the Y-axis tilt sensor 46 detect the horizontal position, the light emitter accommodating tube 28, i.e. the optical axis 34, is at vertical position, and the optical axis of the exit light deflected by the pentagonal prism 61 is set in a horizontal direction.

When the laser diode 55 is turned on, the laser beam is emitted, and turned to parallel luminous fluxes by the objective lens 56. The laser beam is deflected by the pentagonal prism 61 and is projected in a horizontal direction.

By driving the scanning motor 50, the scanning gear 67 is rotated via the scan driving gear 51. Further, the rotating plate 66, the prism holder 59 and the pentagonal prism 61 are rotated integrally with the scanning gear 67, and the laser beam is projected within a horizontal plane by rotary irradiation, and a horizontal reference plane is formed by the laser beam. When the laser beam scans over an object such as a wall surface, a horizontal reference line is formed.

From the light projection window 65, a laser beam to form a vertical reference line is projected.

When the laser surveying instrument 24 is installed at lateral position so that the light emitter accommodating tube 28 is placed at horizontal position, tilting of the light emitter accommodating tube 28 is detected by the Z-axis tilt sensor 47. Based on the result of detection by the Z-axis tilt sensor 47, the leveling motor 41 is driven, and leveling is performed so that the Z-axis tilt sensor 47 detects horizontal position.

Under the condition that the Z-axis tilt sensor 47 detects the horizontal position, because the projecting direction of the laser beam perpendicularly crosses the optical axis 34, a vertical reference plane is formed when the laser beam is projected by rotary irradiation.

Through the light projection window 65, the laser beam is projected in a horizontal direction. By aligning the laser beam with a target point, a vertical reference plane to perpendicularly cross the target is formed.

As described above, the rotating unit cover 63 and the rotating plate 66 to constitute the rotating unit 57 are not in contact with the ceiling plate 53, and this is a structure to reduce the rotation resistance of the rotating unit 57. The first sealing means 68 and the second sealing means 69 are provided between the rotating unit 57 and the ceiling plate 53.

Description will be given below on the effects of the first sealing means 68 and the second sealing means 69 to prevent the intrusion of water and dust. In the following description, an example is taken on the prevention of water intrusion. It is supposed here that the laser surveying instrument 24 is installed at vertical position in outdoor conditions under windy and rainy weather.

When rain falls on the laser surveying instrument 24 from above in diagonal direction, because the first annular ridge 71 is engaged into the third annular groove 76 and the space between the first annular ridge 71 and the third annular groove 76 is narrow, direct intrusion of rainwater through a gap entrance 85 between the rotating unit cover 63 and the ceiling plate 53 is prevented. On the other hand, rainwater may enter through the narrow gap between the first annular ridge 71 and the third annular groove 76 due to capillary phenomenon, and rainwater may ooze out to the first water trap 81. By the presence of the first water trap 81, the intrusion of water due to capillary phenomenon is interrupted.

The oozing water is trapped in the first water trap 81. When the water surface level trapped in the water trap 81 rises up to a level higher than the lower end of the fourth annular ridge 78, a pressure is applied to push out the water between the first annular ridge 71 and the third annular groove 76 by the water trapped in the water trap, and the intrusion of rainwater is prevented as balancing is kept between the pressure and the oozing caused by capillary phenomenon.

Further, when the surface level of the water in the first water trap 81 exceeds the height h1 of the first annular ridge 71, a pressure of the water trapped in the trap applies a power to discharge the water to outside on the water trapped in the trap, and further intrusion of rainwater is prevented. Specifically, the intruding water stays in the first water trap 81, and it fulfills the function of water seal.

When the force of the intruding rain water is higher than the pressure of the water from the first water trap 81 due the force of wind or the like, the water running over the second annular ridge 72 stays in the second annular groove 75. Further, when the intruding water runs over the third annular ridge 73, the water stays in the fifth annular groove 83, and the seventh annular ridge 84 prevents the intruding water from falling down inside the housing 26.

The space from the gap entrance 85 to the fifth annular groove 83 serves as a complicatedly crooked route with the water traps inbetween, and the space causes high resistance to the flow. Therefore, much time is required until the intruding water reaches the fifth annular groove 83. This gives ample time for operations such as the measurement and the like by the surveying instrument.

Next, description will be given on a case where the laser surveying instrument 24 is installed at lateral position, e.g. a case where the laser surveying instrument 24 is rotated in a clockwise direction by an angle of 90° in FIG. 1.

Figure 2:
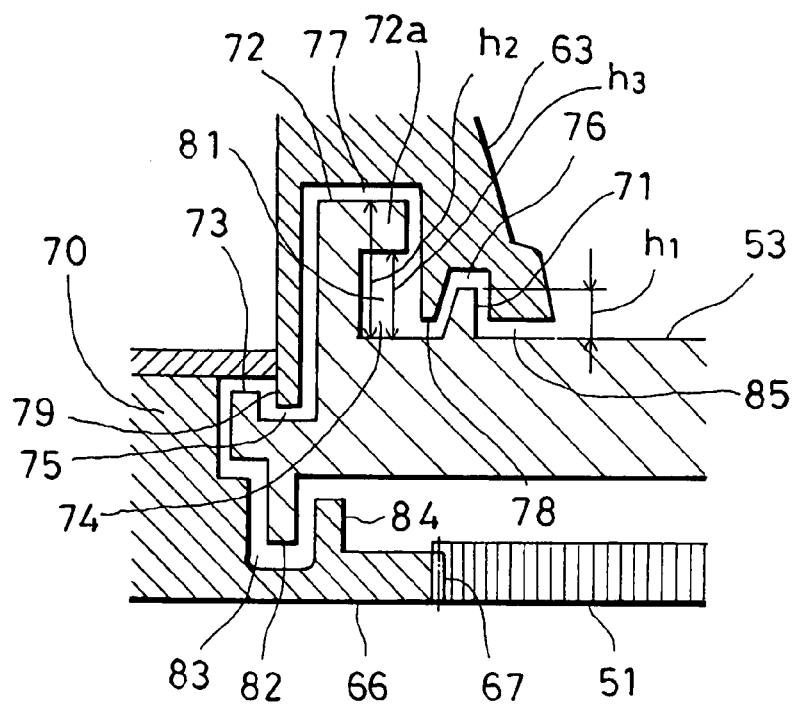
FIG. 2 is a partial cross-sectional view to show an essential portion of a first embodiment of the invention.

Referring to FIG. 2, it is a condition where FIG. 2 is rotated clockwise by an angle of 90° and the gap entrance 85 is at lower position. Then, the water staying in the first water trap 81 and in the second annular groove 75 moves down toward the gap entrance 85 due to the gravitational force. Therefore, even when the rainwater enters the first water trap 81 and the second annular groove 75 and when the water is staying there, the water is discharged by placing the laser surveying instrument 24 at lateral position.

On the other hand, when assumption is made on a case where the first water trap 81 on the opposite side is at upper position, the water staying in the first water trap 81 flows down along the first water trap 81 in annular shape and flows out via the gap entrance 85. On the first water trap 81, which is at upper position, the eave 72a of the second annular ridge 72 is set in vertical position, and the eave 72a fulfills the function as an embankment. This prevents the staying water from moving toward the center.

Therefore, when the water entering the first water trap 81 and the second annular groove 75 is stopped and stays there, and if the laser surveying instrument 24 is placed at lateral position, most of the intruding water can be discharged toward outside.

Figure 3:
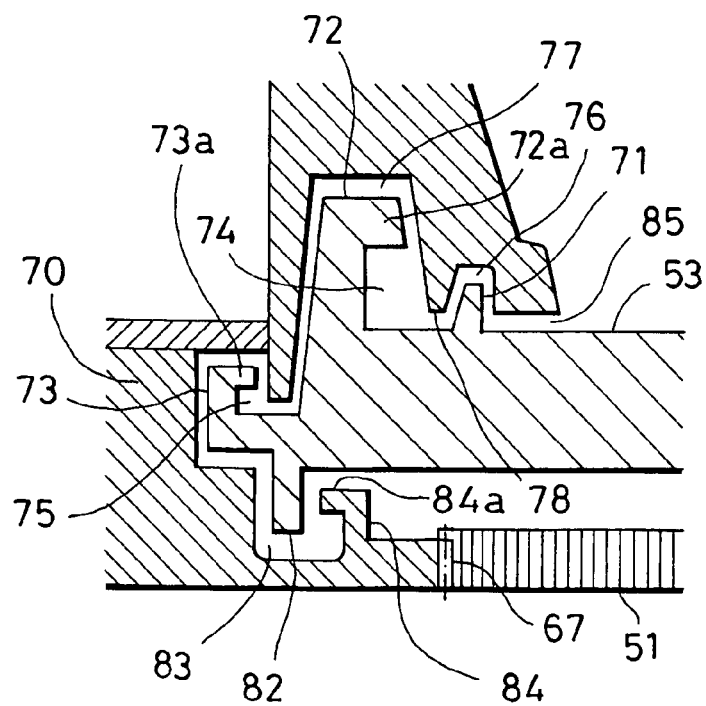
FIG. 3 is a partial cross-sectional view to show an essential portion of a second embodiment of the invention.

FIG. 3 shows a second embodiment of the invention. When the laser surveying instrument 24 is placed at lateral position, the intruding water can be effectively discharged toward outside in this embodiment.

The inner peripheral surface of the second annular ridge 72 is tilted so that the second annular ridge 72 is spread in an upward direction, and the outer peripheral surface of the eave 72a is tilted so that it is spread in a downward direction. The groove wall of the fourth annular groove 77 (inner peripheral surface of the fourth annular ridge 78) is tilted so that the groove wall runs in parallel to the inner peripheral surface of the second annular ridge 72 and the outer peripheral surface of the eave 72a. An eave 73a protruding outward is formed on the upper end of the third annular ridge 73, and an eave 84a protruding in an inward direction is formed on the upper end of the seventh annular ridge 84.

By tilting the inner peripheral surface of the second annular ridge 72 and the outer peripheral surface of the eave 72a, a route between the second annular ridge 72 and the fourth annular groove 77 runs in a vertical direction or tilted in a downward direction. As a result, the water in the gap can easily moved downward, and the intruding water can be effectively discharged to outside. Because the eave 73a is formed, the water trapped in the second annular groove 75 is prevented from entering inside, and the water trapped in the second annular groove 75 can be discharged to outside. The eave 84a fulfills the function as an embankment to the water staying in the fifth annular groove 83, and the water is prevented from falling into the inner space of the housing 26.

It may be so designed that only the inner peripheral surface of one of the second annular ridge 72 and the fourth annular ridge 78 is tilted.

Figure 4:
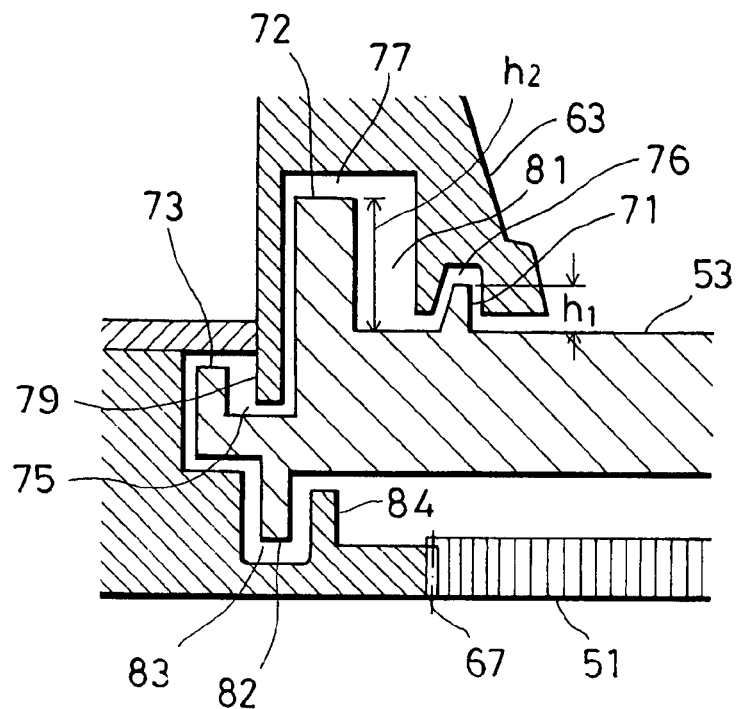
FIG. 4 is a partial cross-sectional view to show an essential portion of a third embodiment of the invention.

FIG. 4 shows a third embodiment of the invention. In this third embodiment, the eave 72a of the second annular ridge 72 in the first embodiment is not used.

In the third embodiment, the height of the second annular ridge 72 is h2, and this is higher than the height h1 of the first annular ridge 71. When the surface level of the water staying in the first water trap 81 is increased to higher than the height h1, a pressure by the water staying in the first water trap 81 applies a power to discharge the water to outside, and this prevents the intrusion of the rainwater.

Figure 5:
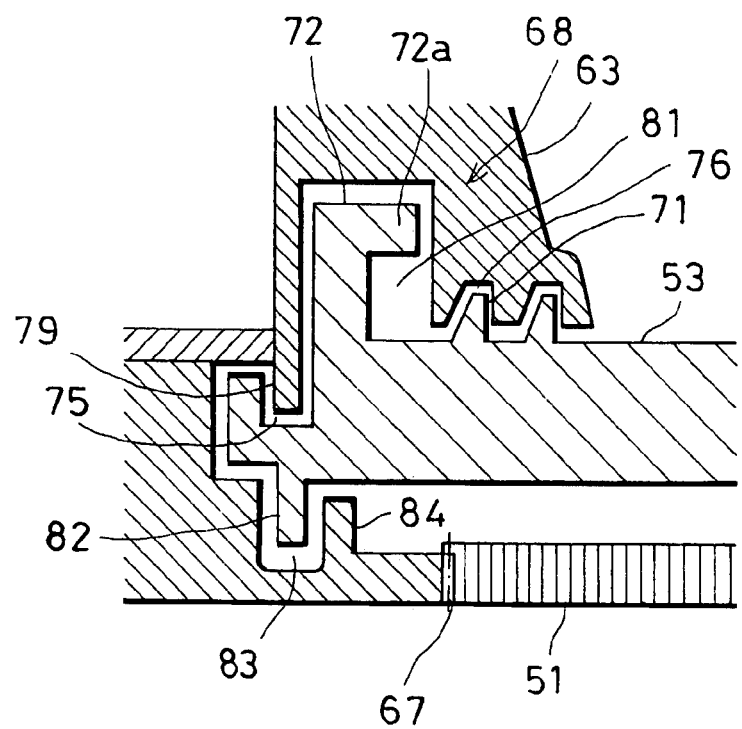
FIG. 5 is a partial cross-sectional view to show an essential portion of a fourth embodiment of the invention.
Figure 6:
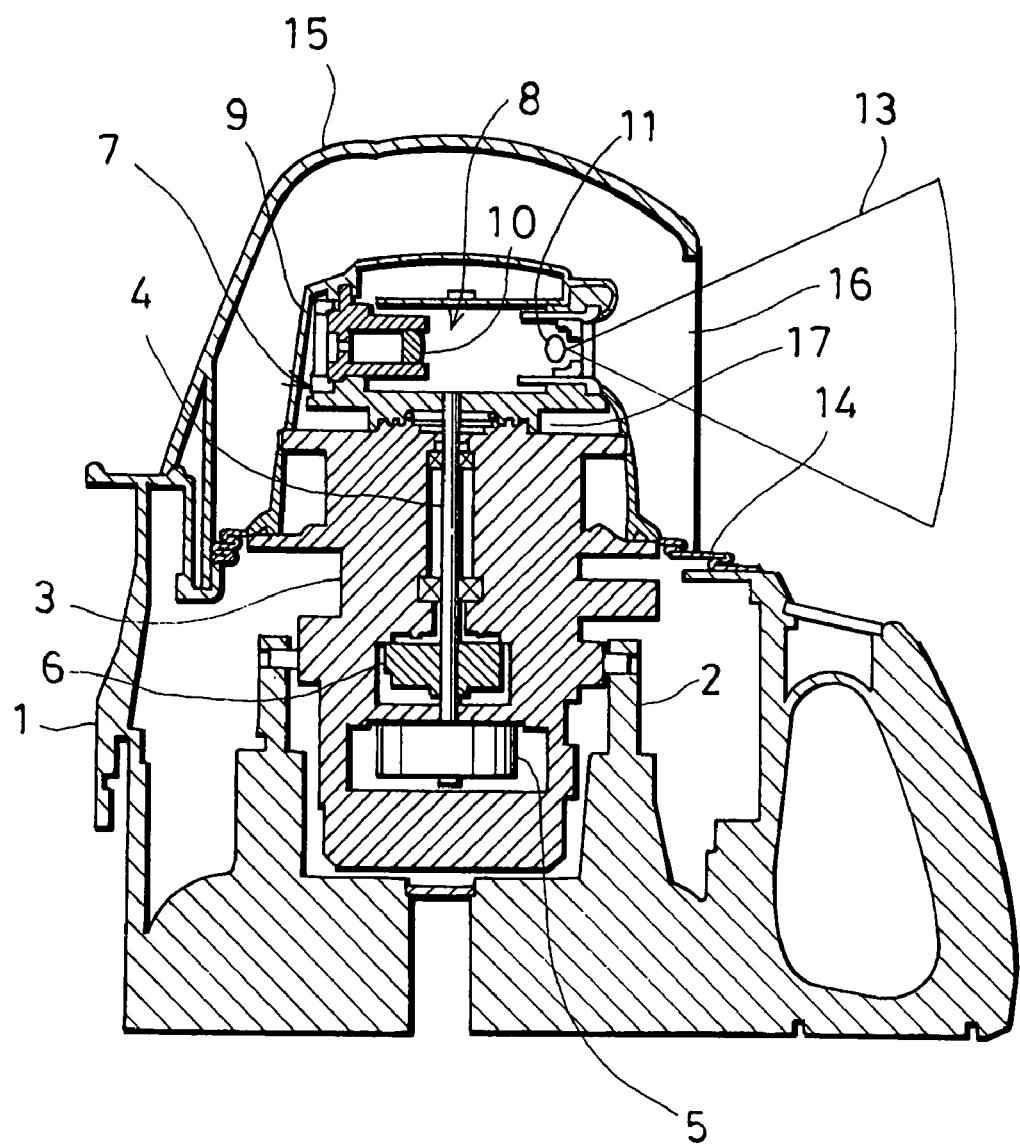
FIG. 6 is a cross-sectional view of a laser surveying instrument according to the prior art.
Figure 7:
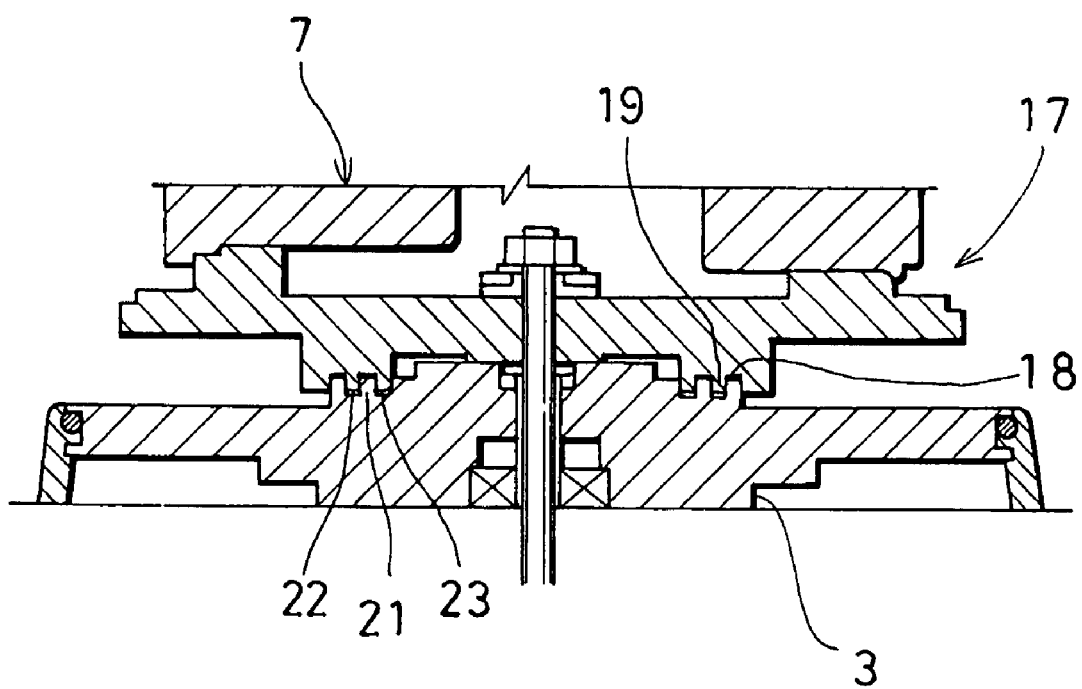
FIG. 7 is an enlarged view to show a sealing part in the laser surveying instrument according to the prior art.

FIG. 5 shows a fourth embodiment of the invention. In this fourth embodiment, the first annular ridge 71 and the third annular groove 76 are formed in double arrangement. By forming the first annular ridge 71 and the third annular groove 76 in double arrangement, sealing capability up to the first water trap 81 are increased, and water preventing effect as the entire first sealing means 68 can be increased.

As described above, according to the present invention, non-contact type sealing means can be provided by the crooked and bent route of the gap, and the first water trap 81 to exclude capillary phenomenon is arranged in the middle of the crooked route of the gap. As a result, the intrusion of water due to capillary phenomenon can be prevented. Because the water trap is provided, the time required for the intrusion of water into the laser surveying instrument 24 can be made longer. The water staying in the water trap can be discharged to outside by tilting or pulling down the laser surveying instrument 24. This makes it possible to use the laser surveying instrument 24 for longer time under bad weather conditions.

It is so designed that a pressure is applied to discharge the water by the water which is accumulated in the first water trap 81. As a result, the intrusion of water from outside can be prevented, and water which exceeds a predetermined water surface level can be discharged to outside. This makes it possible to use the laser surveying instrument for longer time under bad weather conditions.

Next, description will be given on dust preventive effect.

Dust intrudes with the flow of the air, which is a compressed fluid. The sealing means according to the present invention has a route, which is very narrow and complicatedly crooked. This means that the route gives high resistance to the moving of the fluid. Further, the route has a multiple of windings and bendings, which are perpendicularly or almost perpendicularly bent. The intrusion of dust to inner space can be blocked because the dust in the air flow collides with or is brought into contact with the bending portions. Because the water traps with large volume are disposed at the midpoints, the flow of the intrusion air stagnates at the water traps, and this prevents the intrusion of the dust into the inner space. Therefore, sufficient sealing effect can be provided to the flow of dust.

What is claimed is:

1. A laser surveying instrument, comprising a rotating unit for projecting a laser beam by rotary irradiation, a main unit for rotatably supporting said rotating unit, and a sealing means for sealing between said rotating unit and said main unit, wherein said sealing means comprises annular ridges formed on said main unit concentrically to the rotation center of said rotating unit, and annular grooves formed on said rotating unit so that said annular ridges are engaged in said annular grooves and gaps are formed between said annular ridges and said annular grooves, said annular ridges and said annular grooves being arranged concentrically to each other and disposed at least in double arrangement, and wherein said sealing means further comprises a route bent and crooked in a radial direction by said gaps, and a cavity disposed at least at one point along said route and having larger volume than the volume of said gap.

2. A laser surveying instrument according to claim 1, wherein said annular ridges at least include a first annular ridge formed at an outer position and a second annular ridge formed at an inner position, wherein said second annular ridge is higher than said first annular ridge, and said cavity is formed at a point closer to said first annular ridge between said second annular ridge and said annular groove where said second annular ridge is engaged.

3. A laser surveying instrument according to claim 2, wherein an eave protruding in an outward direction is provided on an upper end of said second annular ridge, said cavity is disposed under said eave, and a lower surface of said eave is at a position higher than said first annular ridge.

4. A laser surveying instrument according to claim 1, wherein at least inner peripheral surface of at least one of said annular ridges is tilted in an outward direction toward the upper end.

5. A laser surveying instrument according to claim 2, wherein said rotating unit is mounted so as to sandwich a flat plate which is a part of said main unit, said first annular ridge and said second annular ridge are disposed on an upper surface of said flat plate, a third annular ridge is formed on a lower surface of said flat plate, and an annular groove where said third annular ridge is inserted on non-contact basis is formed on a portion of said rotating unit to face toward the lower surface.

6. A laser surveying instrument according to claim 5, wherein a fourth annular ridge is further formed on the portion of said rotating unit to face toward the lower surface, wherein an eave protruding toward the center is provided on an upper end of said fourth annular ridge, and a cavity is formed under the eave.

7. A laser surveying instrument according to claim 1, 2 or 6, wherein said cavity has gap and volume sufficient to avoid capillary phenomenon.

\* \* \* \* \*